(12) United States Patent
Yasuda et al.

(10) Patent No.: US 10,585,008 B2
(45) Date of Patent: Mar. 10, 2020

(54) BRAKE INSPECTION DEVICE AND BRAKE INSPECTION METHOD

(71) Applicant: Fanuc Corporation, Yamanashi (JP)

(72) Inventors: Ryuuya Yasuda, Yamanashi (JP);
Takeshi Tamaki, Yamanashi (JP);
Katsuya Ono, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 95 days.

(21) Appl. No.: 15/483,439

(22) Filed: Apr. 10, 2017

(65) Prior Publication Data

US 2017/0299452 A1 Oct. 19, 2017

(30) Foreign Application Priority Data

Apr. 15, 2016 (JP) ................... 2016-082220

(51) Int. Cl.
*G01L 5/28* (2006.01)

(52) U.S. Cl.
CPC ..................... *G01L 5/28* (2013.01)

(58) Field of Classification Search
CPC .................. G01L 5/28; G01L 5/288
USPC .......................................... 73/121
See application file for complete search history.

(56) References Cited

U.S. PATENT DOCUMENTS

| | | | |
|---|---|---|---|
| 5,167,148 A | 12/1992 | Black et al. | |
| 6,289,727 B1* | 9/2001 | Ammon | B66D 5/08 73/129 |
| 6,651,494 B1* | 11/2003 | Herterich | F16D 55/02 73/130 |
| 8,686,670 B2* | 4/2014 | Verheyen | H02P 3/04 318/370 |
| 9,061,864 B2* | 6/2015 | Spirgi | B66B 5/0037 |
| 2002/0069697 A1* | 6/2002 | Hofmann | G01L 5/28 73/121 |
| 2004/0104618 A1* | 6/2004 | Yamamoto | B60T 7/042 303/20 |
| 2010/0058850 A1* | 3/2010 | Ortmaier | B25J 13/085 73/121 |
| 2010/0154527 A1* | 6/2010 | Illan | B66B 5/0093 73/121 |

(Continued)

FOREIGN PATENT DOCUMENTS

| | | |
|---|---|---|
| DE | 69201306 T2 | 6/1995 |
| DE | 102006022869 B3 | 9/2007 |

(Continued)

OTHER PUBLICATIONS

Japan Patent Office, Search Report dated Mar. 14, 2018 for Japan Patent Application No. 2016-082220.

(Continued)

*Primary Examiner* — Eric S. McCall
(74) *Attorney, Agent, or Firm* — Winstead PC

(57) ABSTRACT

Provided is a brake inspection device of a motor that includes a load torque measurement unit configured to measure a load torque of the motor; and a determination unit configured to determine a state of a brake based on the load torques measured by the torque measurement unit, the load torques including a load torque measured when the brake being put on a rotor with respect to a stator of the motor and another load torque measured when actuation of the brake is canceled.

5 Claims, 3 Drawing Sheets

(56) References Cited

U.S. PATENT DOCUMENTS

| | | | |
|---|---|---|---|
| 2013/0154522 A1* | 6/2013 | Verheyen | H02P 3/04 318/372 |
| 2014/0000355 A1* | 1/2014 | Shikagawa | G01M 13/00 73/118.01 |
| 2015/0134217 A1 | 5/2015 | Drewes | |
| 2015/0160595 A1 | 6/2015 | Tamada et al. | |
| 2016/0003316 A1* | 1/2016 | Poelzleithner | H02P 3/04 324/765.01 |
| 2017/0336279 A1 | 11/2017 | Schmid | |
| 2019/0017890 A1* | 1/2019 | Ono | G01L 5/28 |

FOREIGN PATENT DOCUMENTS

| | | |
|---|---|---|
| DE | 102012209519 A1 | 12/2013 |
| DE | 10257839 B4 | 12/2014 |
| DE | 102014116714 B3 | 2/2016 |
| JP | H04-265681 A | 9/1992 |
| JP | H06-284766 A | 10/1994 |
| JP | 2000324885 A | 11/2000 |
| JP | 2015-108764 A | 6/2015 |
| WO | WO-9301479 A1 | 1/1993 |

OTHER PUBLICATIONS

Japan Patent Office, Office Action dated Mar. 20, 2018 for Japan Patent Application No. 2016-082220.
German Patent and Trade Mark Office, Office Action dated Mar. 8, 2019 for German Patent Application No. 102017107924.6.

\* cited by examiner

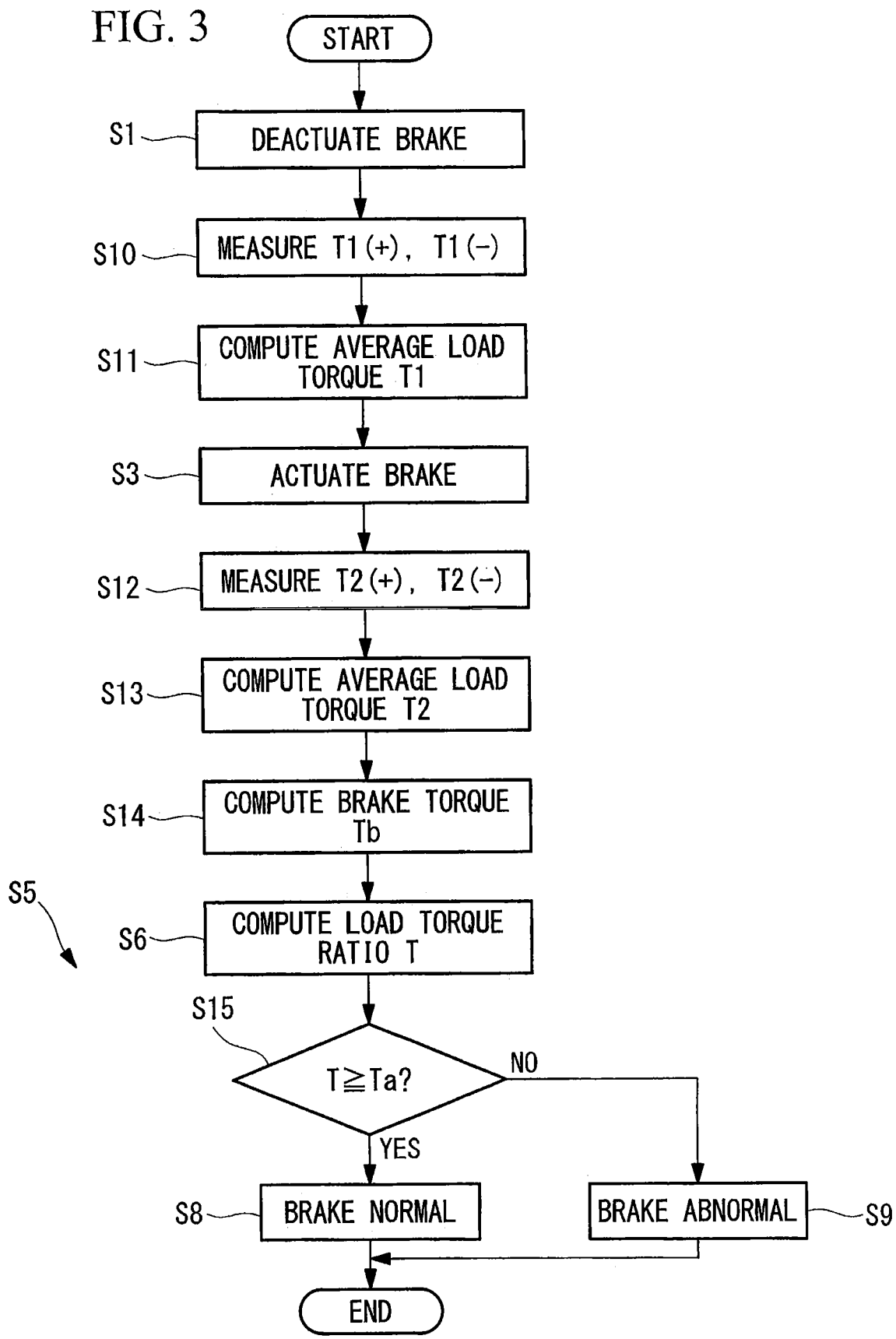

BRAKE INSPECTION DEVICE AND BRAKE INSPECTION METHOD

CROSS-REFERENCE TO RELATED APPLICATIONS

This application is based on Japanese Patent Application No. 2016-082220, the content of which is incorporated herein by reference.

TECHNICAL FIELD

The present invention relates to a brake inspection device and a brake inspection method.

BACKGROUND ART

In the related art, there is a known method of detecting failure of a brake which measures a load torque in a state where actuation of the brake is canceled, compares the measured load torque with a predetermined normal load torque, and thus detects presence or absence of an abnormality in the brake (for example, refer to PTL 1 and PTL 2).

CITATION LIST

Patent Literature

{PTL 1} Japanese Unexamined Patent Application Publication No. Hei06-284766
{PTL 2} Japanese Unexamined Patent Application Publication No. 2000-324885

SUMMARY OF INVENTION

The present invention provides the following solutions.

An aspect of the present invention is directed to a brake inspection device for a motor that includes a load torque measurement unit configured to measure load torques of the motor and a determination unit configured to determine a state of a brake based on the load torques measured by the load torque measurement unit, the load torques including a load torque measured when a brake being put on a rotor of the motor with respect to a stator of the motor is actuated and a load torque measured when actuation of the brake is canceled.

Another aspect of the present invention is directed to a brake inspection method for a motor that includes a first step of measuring a load torque acting on the motor when the brake is actuated; a second step of measuring the load torque acting on the motor when actuation of the brake is canceled; and a third step of determining a state of the brake on the basis of the load torques measured in the first step and the second step.

BRIEF DESCRIPTION OF DRAWINGS

FIG. 3 is a flowchart illustrating a modified example of the brake inspection method of FIG. 2.

DESCRIPTION OF EMBODIMENTS

A brake inspection device 1 of a motor 2 and a brake inspection method in accordance with one embodiment of the present invention are described hereinbelow with reference to the drawings.

Figure 1:
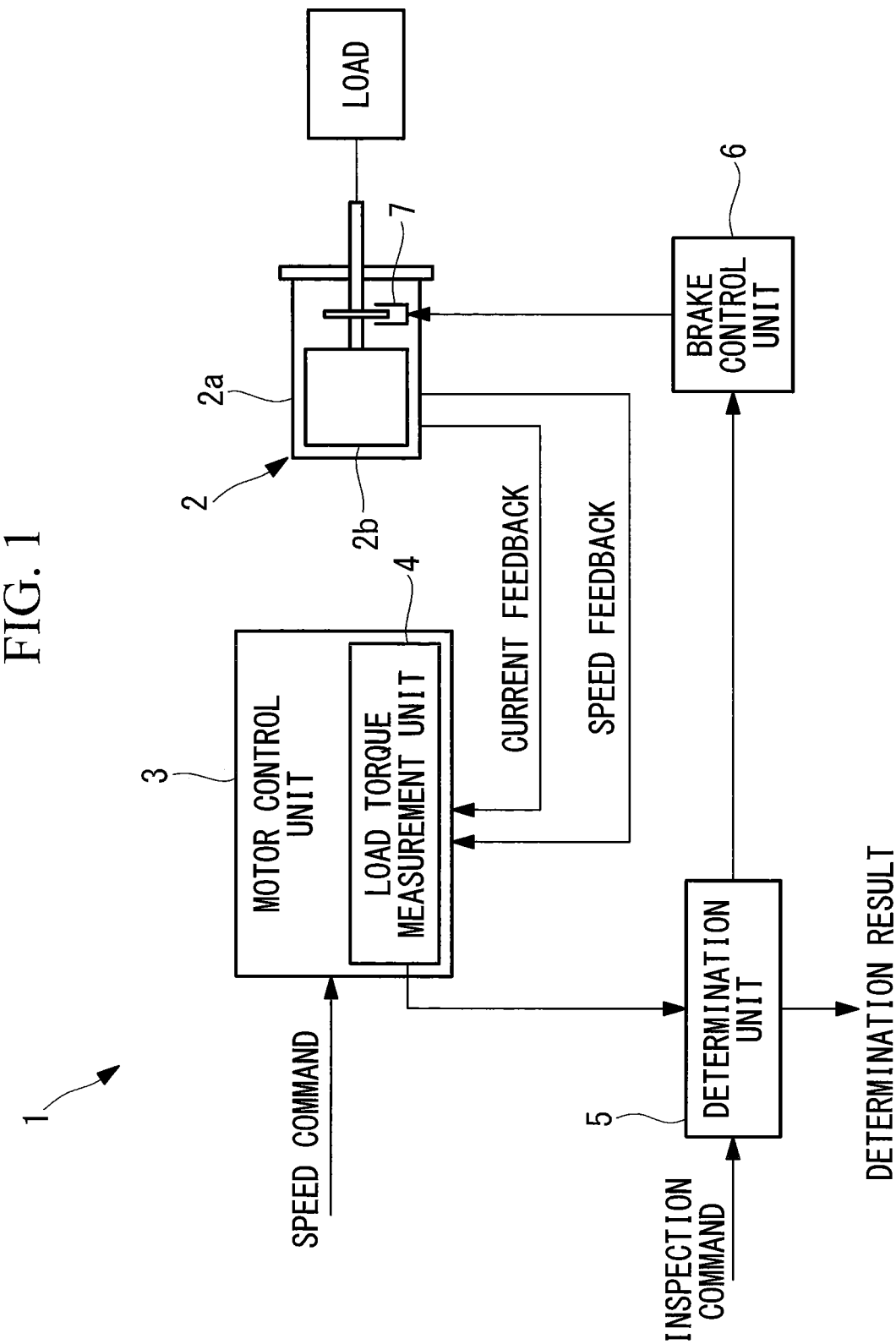
FIG. 1 is a block diagram of a brake inspection device of a motor in accordance with one embodiment of the present invention.

Referring to FIG. 1, the brake inspection device 1 of the motor 2 in accordance with this embodiment is provided in a motor control unit 3 that controls the motor 2. The brake inspection device 1 includes a load torque measurement unit 4 configured to measure an electric current that is fed back from the motor 2 to the motor control unit 3 so as to control the motor 2, and thereby measure a load torque acting on the motor 2, a determination unit 5 configured to determine a state of a brake 7 on the basis of the load torque measured by the load torque measurement unit 4, and a brake control unit 6 configured to control the brake 7.

The determination unit 5 is configured to store a load torque T1 first on the basis of an inspection command to inspect the state of the brake 7. The load torque T1 is measured by the load torque measurement unit 4 when a command to cancel actuation of the brake 7 applying a braking force upon a rotor 2b of the motor 2 with respect to a stator 2a of the motor 2 is output to the brake control unit 6. The determination unit 5 is configured to subsequently store a load torque T2. The load torque T2 is measured by the load torque measurement unit 4 when a command to actuate the brake 7 is output to the brake control unit 6.

In addition, the determination unit 5 is configured to compute a ratio $T=T1/T2\times100(\%)$ of the load torque T1 when the actuation of the brake 7 is canceled to the load torque T2 when the actuation of the brake 7 is canceled, determine the state of the brake 7 in accordance with whether or not the computed load torque ratio T is larger than a predetermined threshold Ta, and output a result of the determination.

Specifically, the determination unit 5 is configured to determine that the actuation of the brake 7 is canceled normally when the ratio T of the load torques is equal to or smaller than the predetermined threshold Ta and determine that an abnormality exists in the brake 7 when the ratio T is larger than the threshold Ta.

The brake inspection method using the brake inspection device 1 with the above-described configuration in accordance with this embodiment is described below.

Figure 2:
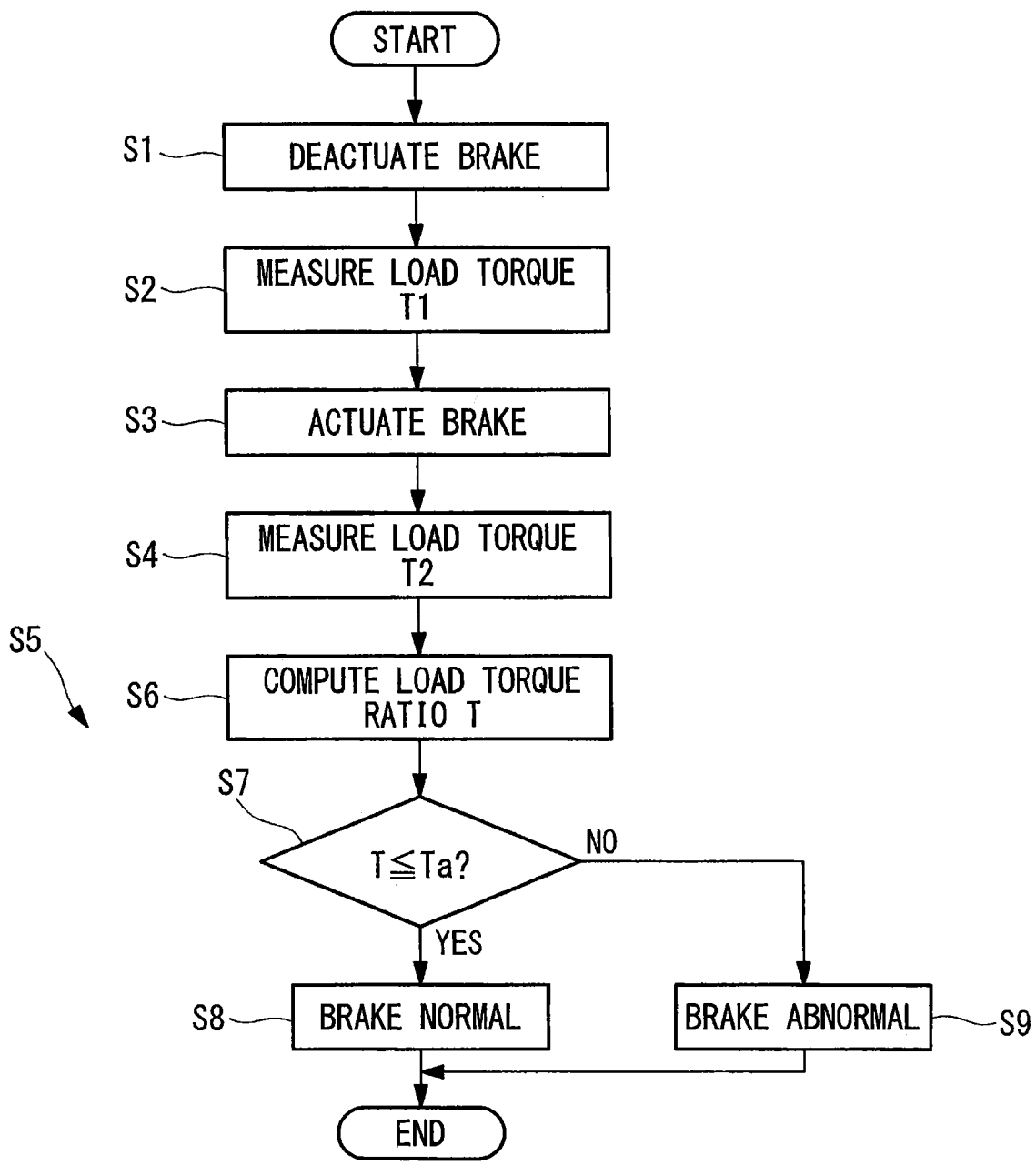
FIG. 2 is a flowchart for explanation of a brake inspection method using the brake inspection device of FIG. 1 in accordance with one embodiment of the present invention.

Referring to FIG. 2, the brake inspection method in accordance with this embodiment includes a step S1 in which the brake control unit 6 cancels actuation of the brake 7, a step S2 (second step) in which the load torque measurement unit 4 measures the load torque T1 at this point, a step S3 in which the brake control unit 6 actuates the brake 7, a step S4 (first step) in which the load torque measurement unit 4 measures the load torque T2 at this point, and a step S5 (third step) of determining the state of the brake 7 on the basis of the load torques T1 and T2 measured in the steps S2 and S4.

The third step S5 includes a step S6 of computing the load torque ratio T between the load torques T1 and T2 measured in the first step S4 and the second step S2, and a comparison step S7 of comparing the load torque ratio T with the predetermined threshold Ta computed in the step S6. In the comparison step S7, when the load torque ratio T is equal to or smaller than the predetermined threshold Ta, an output indicative of the fact that actuation of the brake 7 is canceled normally is output (step S8). On the other hand, when the load torque ratio T is larger than the threshold Ta, another output indicative of the fact that an abnormality exists in the brake 7 is output (the step S9).

According to the brake inspection device 1 and the brake inspection method with the above-described configurations in accordance with this embodiment, it is made possible to always determine the state of the brake 7 at that point in accordance with the comparison of the load torque T1 in the state where the brake 7 is actuated with the load torque T2 in the state where actuation of the brake 7 is canceled. As a result, in contrast to the traditional method that compares the load torque T1 measured in the state where the actuation of the brake 7 is canceled with the stored load torque T2 in the state where the brake 7 is in a normal state, the device and the method of the present invention has an advantage that they are capable of measuring the state of the brake 7 accurately and in a simple manner even when the load torques T1 and T2 vary depending on changes over time and the individual difference of the motor 2.

It should be noted that, in this embodiment, the inspection of the state of the brake 7 is carried out on the basis of the load torque ratio T of the load torque T1 when the actuation of the brake 7 is canceled to the load torque T2 when the brake 7 is actuated. Alternatively, the state of the brake 7 may be determined on the basis of the load torques in forward and reverse directions measured by the load torque measurement unit 4 by actuating the motor 2 in both directions in the state where the brake 7 is actuated and in the state where the actuation of the brake 7 is canceled.

Specifically, as illustrated in FIG. 3, a positive-direction load torque T1(+) and a negative-direction load torque T1(−) are measured (step S10) in the state where the actuation of the brake 7 is canceled (the step S1); the positive-direction load torque T2(+) and the negative-direction load torque T2(−) are measured (step S12) in the state where the brake 7 is actuated (step S3); and an average load torque T1=(T1(+)−T1(−))/2 in the state where actuation of the brake 7 is canceled and an average load torque T2=(T2(+)−T2(−))/2 in the state where the brake 7 is actuated are computed (steps S11, S13).

In addition, in the third step S5 of determining whether or not the brake 7 is normal, a brake torque Tb=T2−T1 is computed (step S14), and T=Tb/T0×100(%) is computed as the load torque T0 of the brake 7 in the normal state (step S6). The computed "T" is then compared with the predetermined threshold Ta (%) (step S15), and, if T≥Ta, then it is determined that the brake 7 is normal (step S8). If T<Ta, then it is determined that an abnormality exists in the brake 7 (step S9).

In this manner, the present invention has the advantage that it is made possible to carry out inspection of the state of the brake 7 accurately and in a simple manner even when the load torque takes different values in response to the forward or reverse direction of the motor 2 by measuring the load torques in the forward and reverse directions and thereby determining the state of the brake 7. Also, another advantage of the brake inspection device 1 and the brake inspection method in accordance with this embodiment is that an external device such as an oscilloscope does not need to be installed to carry out inspection of the state of the brake 7 while it is made possible to monitor the state of the brake 7 periodically or on an as-needed basis without additional man hours and costs incurred by installation of such a device.

Also, when the brake 7 provided in the motor 2 that drives a gravity axis is to be inspected, the positive direction may be defined as an upward direction and the negative direction as a downward direction, a margin torque Tm until the gravity axis falls may be introduced as the negative-direction load torque T2(−) in the state where the brake 7 is actuated, and the ratio T=Tm/Tb×100(%) of the margin torque Tm to the brake torque Tb may be compared with the predetermined threshold Ta, and, if T≥Ta, then it may be determined that the brake 7 is normal while it may be determined that an abnormality exists in the brake 7 if T<Ta.

As a result, the above-described embodiment leads to the following aspects.

An aspect of the present invention is directed to a brake inspection device for a motor that includes a load torque measurement unit configured to measure load torques of the motor and a determination unit configured to determine a state of a brake based on the load torques measured by the load torque measurement unit, the load torques including a load torque measured when a brake being put on a rotor of the motor with respect to a stator of the motor is actuated and a load torque measured when actuation of the brake is canceled.

According to this aspect, the brake is actuated to place the rotor in a braking state relative to the stator, and in this state the load torque of the motor is measured by the load torque measurement unit, while actuation of the brake is canceled to allow the rotor to be rotatable relative to the stator and in this state the load torque of the motor is measured by the load torque measurement unit, and then the state of the brake is determined by the determination unit on the basis of the two load torques. That is, when the brake is in a defective state, for example, when the mechanical unit that cancels actuation of the brake fails, the load torque measured in the state where the braking force is canceled becomes large to be close to the load torque at the time of application of braking.

Accordingly, it is possible to readily determine the state of the brake when the load torque measured while the brake is actuated and the load torque measured while actuation of the brake is canceled are relied on. In this case, even when the load torque of the motor varies depending on changes over time or the individual difference of the motor, it is possible to detect the state of the brake accurately by measuring the load torques in the state of actuation of the brake and the state of deactuation (cancellation of actuation) of the brake and comparing these load torques.

In the context of the above-described aspect, the determination unit may be configured to determine that an abnormality exists in the brake when a ratio of the load torque measured by the load torque measurement unit when the actuation of the brake is canceled to the load torque measured by the load torque measurement unit when the brake is actuated is larger than a predetermined threshold.

With the features described above, when the load torque in the state of deactuation of the brake becomes large, then the mechanical unit that cancels the actuation of the brake is likely to be broken. Accordingly, it is possible to determine readily and accurately that the brake is abnormal when the ratio of the load torque in the state of deactuation of the brake to the load torque in the state of actuation of the brake is larger than the predetermined threshold.

In the context of the above-described aspect, the determination unit may be configured to determine the state of the brake on the basis of the load torques in forward and reverse directions measured by the load torque measurement unit by actuating the motor in both directions while the brake is actuated and the load torques in the forward and reverse directions measured by the load torque measurement unit by actuating the motor in both directions while the actuation of the brake is canceled.

With the features described above, even when the load torques in the forward and reverse directions differ from each other, it is possible to readily and accurately determine the state of the brake by comparing the load torque of the state of actuation of the brake with the load torque of the state of deactuation of the brake.

In the context of the above-described aspect, the determination unit may be configured to determine that that an abnormality exists in the brake when a ratio of a difference between an average value of the load torques of the forward and reverse directions measured while the brake is actuated and an average value of the load torques in the forward and reverse directions measured while the actuation of the brake is canceled to a brake torque in a normal state is smaller than a predetermined threshold.

With the features described above, the difference between the load torque in the state of actuation of the brake and the load torque of the state of deactuation of the brake may be considered in the evaluation by the difference between the average values and it is made possible to readily and accurately determine the state of the brake.

Another aspect of the present invention is directed to a brake inspection method for a motor that includes a first step of measuring a load torque acting on the motor when the brake is actuated; a second step of measuring the load torque acting on the motor when actuation of the brake is canceled; and a third step of determining a state of the brake on the basis of the load torques measured in the first step and the second step.

An advantageous effect of the present invention is that it is possible to accurately detect the state of the brake even in the presence of variation in the load torque of the motor.

REFERENCE SIGNS LIST 1 brake inspection device
2 motor
2a stator
2b rotor
4 load torque measurement unit
5 determination unit
7 brake
S2 second step
S4 first step
S5 third step
T0, T1, T2 load torque
Ta threshold
Tb brake torque

The invention claimed is:

1. A brake inspection device of a motor, the brake inspection device comprising:
 a brake controller configured to control a brake provided in the motor to hold or actuate a rotor of the motor;
 a load torque measurement unit connected to the motor, the load torque measurement unit being configured to measure load torques of the motor;
 a determination unit configured to determine a state of the brake based on the load torques measured by the load torque measurement unit, the load torques including a load torque measured when the brake being put on a rotor of the motor with respect to a stator of the motor is actuated and a load torque measured when actuation of the brake is canceled; and
 wherein the determination unit is configured to determine the state of the brake based on the load torques in forward and reverse directions measured by the load torque measurement unit by actuating the motor in both directions in a state in which the brake is actuated and the load torques in the forward and reverse directions measured by the load torque measurement unit by actuating the motor in both directions in a state in which the actuation of the brake is canceled.

2. The brake inspection device of the motor according to claim 1, wherein the determination unit is configured to determine that an abnormality exists in the brake when a ratio of a difference between an average value of the load torques of the forward and reverse directions measured in the state in which the brake is actuated and an average value of the load torques in the forward and reverse directions measured in the state in which the actuation of the brake is canceled to a brake torque in a normal state is smaller than a predetermined threshold.

3. The brake inspection device of the motor according to claim 2, wherein the determination unit determines that the actuation of the brake is not canceled normally as an abnormality in the brake.

4. A brake inspection method for a motor, the brake inspection method comprising:
 controlling a brake provided in the motor to hold or actuate a rotor of the motor;
 measuring a load torque acting on the motor when a brake is actuated;
 measuring the load torque acting on the motor when actuation of the brake is canceled;
 determining a state of the brake based on the measured load torque acting on the motor when the brake is actuated and the measured load torque acting on the motor when actuation of the brake is canceled; and
 wherein the determining of the state of the brake determines the state of the brake based on the measured load torques in forward and reverse directions by actuating the motor in both directions in a state in which the brake is actuated and the measured load torques in the forward and reverse directions by actuating the motor in both directions in a state in which the actuation of the brake is canceled.

5. A brake inspection device of a motor, the brake inspection device comprising:
 a brake controller configured to control a brake provided in the motor to hold or actuate a rotor of the motor;
 a load torque measurement unit connected to the motor, the load torque measurement unit being configured to measure load torques of the motor;
 a determination unit configured to determine a state of the brake based on the load torques measured by the load torque measurement unit, the load torques including a load torque measured when the brake being put on a rotor of the motor with respect to a stator of the motor is actuated and a load torque measured when actuation of the brake is canceled;
 wherein the determination unit is configured to determine that an abnormality exists in the brake when a ratio of the load torque measured by the load torque measurement unit when the actuation of the brake is canceled to the load torque measured by the load torque measurement unit when the brake is actuated is larger than a predetermined threshold; and
 wherein the determination unit determines that the actuation of the brake is not canceled normally as an abnormality in the brake.

* * * * *